United States Patent [19]

Barlow et al.

[11] Patent Number: 4,563,946

[45] Date of Patent: Jan. 14, 1986

[54] PIZZA PAN

[76] Inventors: Richard A. Barlow, 949 Marymount Rd., Salina, Kans. 67401; Eugene T. Logan, 2404 Parkwood Cir., Claremore, Okla. 74017

[21] Appl. No.: 633,850

[22] Filed: Jul. 24, 1984

[51] Int. Cl.$^4$ .............................................. A47J 37/01
[52] U.S. Cl. ............................... 99/450; 99/DIG. 15; 428/131
[58] Field of Search .......................... 428/64, 131, 65; 99/430, 450, DIG. 15; 118/13

[56] References Cited

U.S. PATENT DOCUMENTS

| 254,770 | 3/1882 | Hurd | 99/450 |
|---|---|---|---|
| 476,340 | 6/1892 | Wagandt | 99/430 |
| 1,316,365 | 9/1919 | Jackson | 99/450 |
| 1,343,395 | 6/1920 | Kinkel | 99/430 |
| 1,778,846 | 10/1930 | Carlson | 99/426 |
| 1,781,302 | 11/1930 | Roberts | 99/450 |
| 2,346,839 | 4/1944 | Harriss et al. | 99/430 |
| 2,413,204 | 12/1946 | Wolff | 99/425 X |
| 2,573,719 | 11/1951 | Lebherz | 99/447 X |
| 3,229,886 | 1/1966 | Grogel | 99/DIG. 15 |
| 3,545,645 | 12/1970 | Smith | 99/DIG. 15 |
| 3,987,719 | 10/1976 | Kian | 99/422 |
| 4,131,080 | 12/1978 | Hughes | 118/13 |
| 4,176,591 | 12/1979 | Power | 99/430 |
| 4,184,421 | 1/1980 | Ahlgren | 99/450 |

Primary Examiner—Henry F. Epstein
Attorney, Agent, or Firm—Head, Johnson & Stevenson

[57] ABSTRACT

A pizza pan having a substantially flat bottom surface surrounded by an arcuate or concave peripheral wall which terminates, at its outer edge, in a tubular element surrounding the entire outer periphery of the pan. A plurality of relatively small apertures are provided on the bottom of the pan and are selectively spaced thereon to provide a sufficient flow of heat to the central portion of the underside of the crust for an efficient baking thereof. A sufficiently great solid area is provided around the perforated area for supporting the outer edges of the pizza in a manner whereby the transfer of heat thereto is reduced with respect to the heat transfer at the perforate area to assure an even baking of the entire pizza.

5 Claims, 4 Drawing Figures

PIZZA PAN

BACKGROUND OF THE INVENTION

1. Field of the Invention

This invention relates to improvements in cooking utensils, and more particularly, but not by way of limitation, to a pan for facilitating the baking of pizza, and the like.

2. Description of the Prior art

Pizza normally comprises a substantially flat circular crust having a plurality of selected ingredients, such as cheese, meat, onions, tomatoes, and the like, placed on the upper surface thereof. The pizza is usually cooked or baked by placing the crust of the pizza either on a cookie sheet or directly on the cooking surface or rack of the oven, or the like, wherein the pizza is being prepared. Neither of these pizza cooking methods is entirely satisfactory, however, since in order to produce the best end result for the cooked or baked pizza and to obtain an even baking thereof, the central portion of the pizza must receive more heat than the outer edges thereof. The cooking of the pizza directly on the bar over rack applies the heat substantially equally and simultaneously to the entire area of the pizza, as does the cooking of the pizza on a cookie sheet, or the like. Thus, the disadvantages of the present methods of preparing or baking pizza will be readily apparent.

There have been attempts to solve cooking problems of this type, such as shown in the Jackson et al U.S. Pat. No. 1,316,365; Carlson U.S. Pat. No. 1,778,846; Roberts U.S. Pat. No. 1,781,302; Harriss et al U.S. Pat. No. 2,346,839; Wolff U.S. Pat. No. 2,413,204; Lebherz U.S. Pat. No. 2,573,719; Kian U.S. Pat. No. 3,987,719 and the Power U.S. Pat. No. 4,176,591.

The Power patent is particularly directed to a pan for facilitating the baking of pizza, and includes a plurality of relatively large apertures spaced over the cooking surface of the pan and provides a specific ratio of surface area to void areas. This structure has certain disadvantages in that it is difficult to achieve a consistency for the baked crust of the pizza. If the baking is sufficient for achieivng a desired "doneness" or browning of the crust portion supported by the closed surface areas, then the areas of the crust open to the apertures is overcooked. Conversely, if the baking is sufficient for achieving a desired "doneness" of the crust portions open to the apertures, then the remaining portions of the crust may be undercooked. In either event, the appearance of the baked crust is usually spotty and unattractive, which is a detriment not only to the appearance of the food product, but also to the overall edible nature of the pizza.

SUMMARY OF THE INVENTION

The present invention contemplates a novel pizza pan which has been particularly designed and constructed for overcoming the foregoing disadvantages. The novel pan is primarily constructed for the baking of frozen pizza, but also functions well in the baking of fresh pizza. The pan comprises a relatively shallow pan having a substantially flat central bottom portion surrounded by a peripheral sidewall portion of an arcuate cross sectional configuration. The flat bottom portion is provided with a plurality of spaced relatively small apertures disposed within a preselected diametrical area of the bottom portion which is slightly smaller than the outer diameter of the flat bottom portion. The pan is preferably constructed to provide a ratio of hole or aperture diameter to pan thickness of approximately 2.5 to 1. The apertures are preferably approximately ⅛" in diameter which allows moisture to escape and the heat to penetrate without exposing the crust to a spotted over-baking effect inside the open hole area. The outer diameter of the apertured central area of the pan is somewhat less than the outer diameter of the usual or most popular size pizzas whereby the pizza crust will slightly overlap the perforated area in order to substantially preclude any accidental spillage of the ingredients of the pizza into the perforations. In addition, the outer edge of the pizza is supported by the solid portion of the bottom of the pan whereas the central portion of the pizza is supported by the central perforated area of the pan. Thus, the central portion of the pan directs a greater amount of heat directly to the central portion of the pizza while the outer edge of the pizza is properly cooked. The arcuate configuration of the peripheral sidewalls of the pan join the bottom portion at a relatively large radius which is configured of a size complementary to the diameter of the usual pizza cutter. This permits the complete cut-through of the baked pizza without removing the pizza from the baking utensil or pan. The novel pizza pan is simple and efficient in operation and economical and durable in construction.

DETAILED DESCRIPTION OF THE PREFERRED EMBODIMENT

Figure 1:
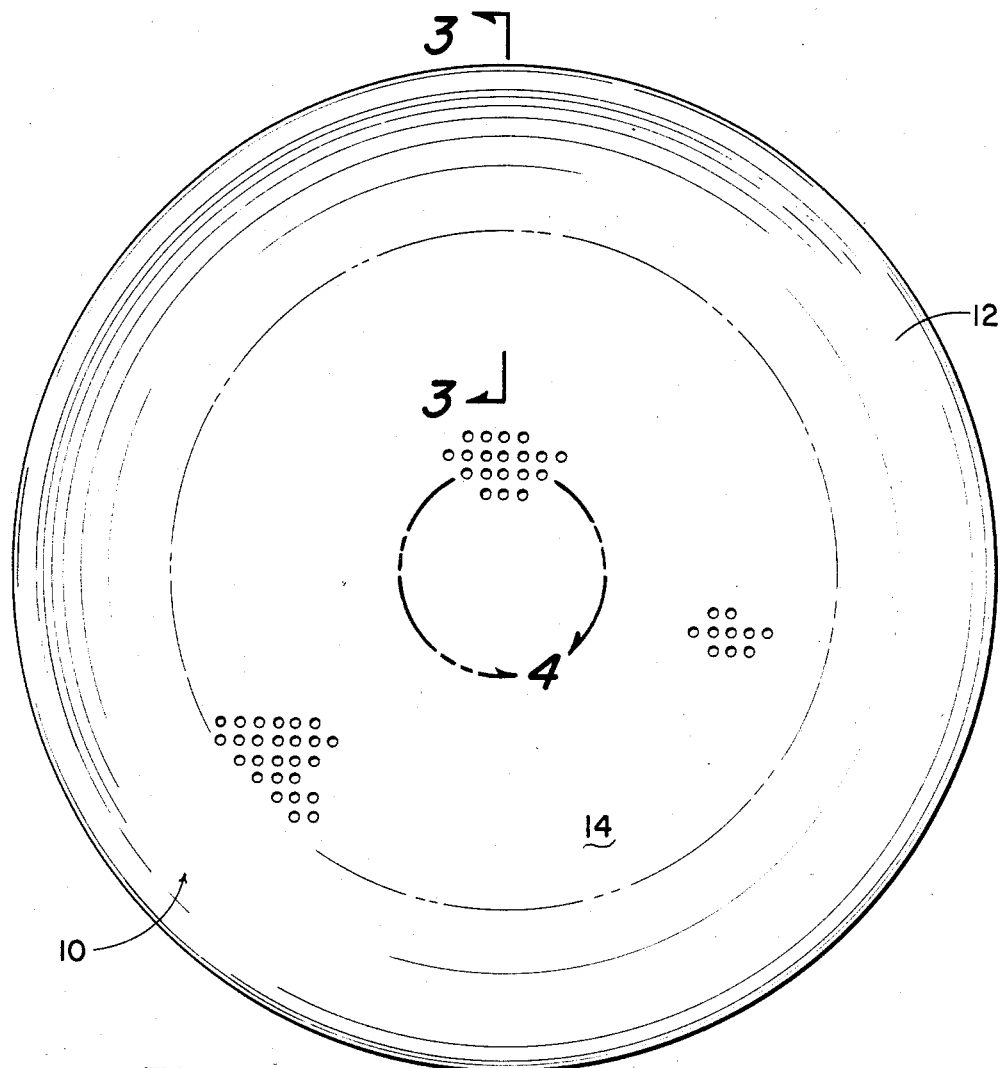
FIG. 1 is a plan view of a pizza pan embodying the invention.
Figure 2:
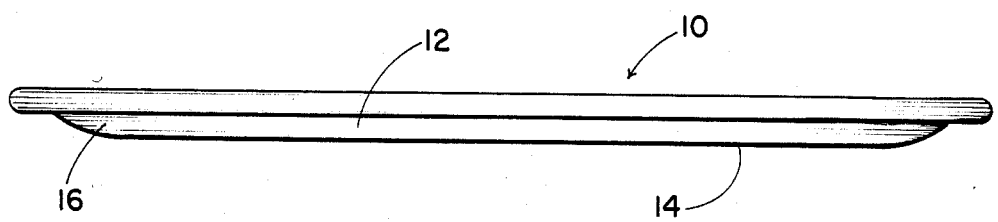
FIG. 2 is a side elevational view of a pizza pan embodying the invention.

Referring to the drawings in detail, reference character 10 generally indicates a pizza pan comprising a metallic body 12 preferably having a substantially circular planar configuration, but not limited thereto. The central portion 14 of the body 12 is preferably substantially flat, and the peripheral edge or sidewall 16 extends outwardly therefrom in a substantially arcuate or concave configuration, as particularly shown in FIGS. 2 and 3. The arcuate portion of the sidewall 16, particularly as it joins the bottom 14 is preferably of a size complementary with or corresponding to the outer diameter of the usual pizza cutter (not shown) as will be hereinafter set forth. The inner surface of the peripheral edge 16 preferably blends smoothly into the inner or upper surface of the bottom 14 to provide an uninterrupted surface throughout the interior of the pan 10. The dish-shaped or bowl-shaped configuration of the pan 10 provides a rigidity for the structure and protects the outer edge of the pizza from the side heat of the oven (not shown) during a baking operation.

Figures 3, 4:
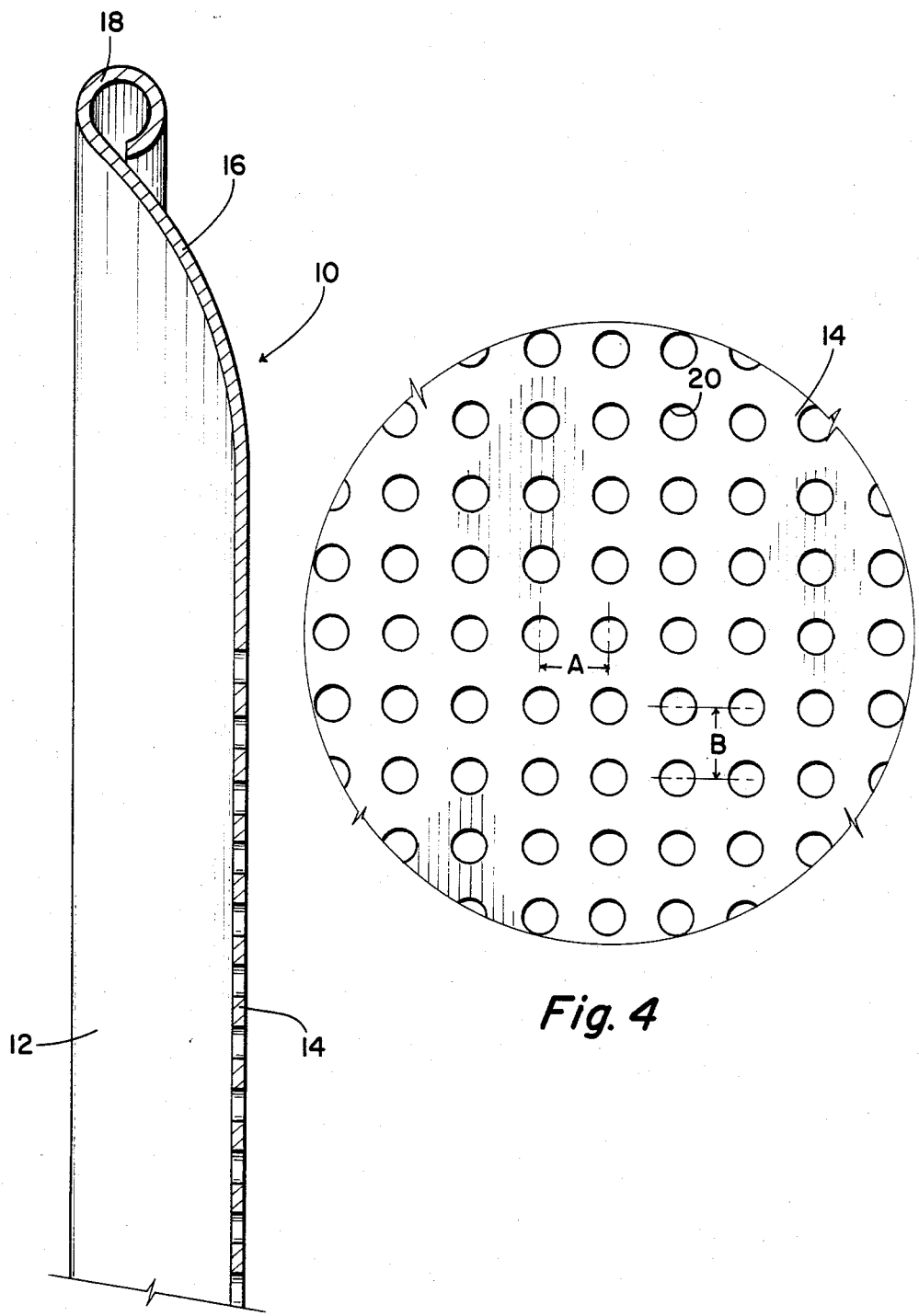
FIG. 3 is an enlarged sectional view taken on line 3—3 of FIG. 1.
FIG. 4 is an enlarged view of the area encircled by the arrow 4 of FIG. 1.

The outer rim 18 of the peripheral wall 16 is preferably substantially tubular, as will be particularly seen in FIG. 3. The tube 18 extends around the entire outer periphery of the pan 10, and forms a handle means for facilitating the manual handling or manipulation of the pan 10 during a baking operation. In addition, the tubular configuration of the rim 18 substantially eliminates any sharp edges at the outer periphery of the pan 10 for reducing inadvertent injury to the user thereof.

The central portion of the bottom 14 of the pan 10 is provided with a plurality of spaced relatively small apertures 20. As shown herein, the apertures 20 are preferably spaced at regular preselected intervals in both the X and Y axis, but are not limited thereto. The apertures 20 are preferably of a diametric size substantially equal to $\frac{1}{8}''$ or slightly smaller. The spacing between the centerlines of adjacent apertures 20 is preferably approximately $\frac{1}{4}''$ in both the X and Y directions, and as shown at A and B in FIG. 4. In addition, it is preferable that the apertures 20 be spaced symmetrically about both the central axes of the bottom 14, but not limited thereto. For example, the centerlines apertures positioned on each side of the X axis may be spaced approximately $\frac{1}{8}''$ from the X axis, and the centerlines of the apertures positioned on each side of the Y axis may be spaced approximately $\frac{1}{4}''$ from the Y axis. This provides a symmetry to the construction of the bottom 14 and assures an even distribution of the heat to the underside of the pizza crust placed within the interior of the pan 10. The outer diameter of the area containing or defined by the apertures is somewhat less than the outer diameter of the pizza to be baked in the pan 10. Thus, the outer edges of the pizza will be supported by an imperforate area whereas the central portion of the pizza will be supported by the perforated area.

In use, the pizza may be constructed in the usual manner whereby the crust is placed on the bottom surface 14 of the pan 10. The crust of the pizza preferably terminates at the outer extremity of the bottom 14, although it may be preferable to extend the crust at least somewhat along the inner surface of the peripheral wall 16. The ingredients of the pizza may be placed on the upper or exposed surface of the crust, and the pan 10 may be placed in a suitable oven for the baking operation. The placement of the pan and pizza within the oven is greatly facilitated as compared to the usual placing of the "bare" pizza directly on the cooking surface or rack (not shown) of the oven (not shown). When the pizza baking operation has been completed, the pan 10 and contents may be easily removed from the oven for ready retrieval of the pizza. The pizza may be cut or suitably severed into the desired serving sizes, and the unconsumed portions of the pizza may be stored in the pan 10, if desired.

The size of the apertures 20 is particularly selected to assure the passage of sufficient heat to the central portion of the pizza for an efficient baking thereof and to permit the escape of moisture during the baking operation. The imperforate portion of the bottom 14 surrounding the central perforated portion supports the outer circumferential portion of the pizza during the baking operation and reduces the application of heat thereto with respect to the heat being directed to the central portion of the pizza, thus providing the efficient simultaneous cooking of both the outer portions and central portions of the pizza. The relatively small size of the apertures 20 also substantially preclude a "spotty" appearance of the bottom of the pizza crust subsequent to the baking process. In addition, the inward spacing of the apertures 20 with respect to the outer diameter of the bottom portion 14 substantially precludes any accidental spillage of the pizza ingredients into the area of the apertures.

From the foregoing, it will be apparent that the present invention provides a novel pan for facilitating the baking of pizza, and the like. The novel pizza pan provides an efficient flow of heat to the underside of the pizza crust during the baking operation for assuring an even baking of the pizza and eliminates any "spotty" appearance of the baked pizza crust. In addition, the arcuate peripheral sidewalls of the pan cooperates with the usual pizza cutter for facilitating the cutting of the pizza.

Whereas the present invention has been described in particular relation to the drawings attached hereto, it should be understood that other and further modifications, apart from those shown or suggested herein may be made within the spirit and scope of this invention.

What is claimed is:

1. A pizza pan comprising a substantially flat bottom, a large radius, smooth peripheral wall conterminous with the bottom as a uniform uninterrupted surface, the wall extending upwardly and outwardly therefrom, and a plurality of spaced relatively small apertures provided in the bottom and contained within a central area smaller than the diameter of the bottom leaving a border of no apertures for the even distribution of heat to the central underside of the pizza during a pizza baking operation.

2. A pizza pan as set forth in claim 1 wherein handle means is provided around the outer rim of the peripheral wall for facilitating manipulation of the pan, the handle formed of a smaller diameter tubular configuration of a reverse curve to that of the peripheral wall yet as a smooth continuation of the peripheral wall.

3. A pizza pan as set forth in claim 1 wherein the apertures are each approximately $\frac{1}{8}''$ in diameter.

4. A pizza pan as set forth in claim 3 wherein the adjacent apertures are spaced on approximately $\frac{1}{4}''$ centerlines.

5. A pizza pan as set forth in claim 1 wherein the apertures are symmetrically spaced about the center of the bottom.

* * * * *